US011502563B2

(12) United States Patent
Ueda et al.

(10) Patent No.: US 11,502,563 B2
(45) Date of Patent: Nov. 15, 2022

(54) ROTOR, SPOKE TYPE MOTOR, VEHICLE MOTOR, UNMANNED FLYING BODY, ELECTRIC ASSIST DEVICE, AND ROBOT DEVICE

(71) Applicant: NIDEC CORPORATION, Kyoto (JP)

(72) Inventors: Tomoya Ueda, Kyoto (JP); Shinji Takemoto, Kyoto (JP); Yusuke Isogai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 257 days.

(21) Appl. No.: 16/638,457

(22) PCT Filed: Sep. 28, 2018

(86) PCT No.: PCT/JP2018/036372
§ 371 (c)(1),
(2) Date: Feb. 11, 2020

(87) PCT Pub. No.: WO2019/066003
PCT Pub. Date: Apr. 4, 2019

(65) Prior Publication Data
US 2020/0259378 A1    Aug. 13, 2020

(30) Foreign Application Priority Data
Sep. 28, 2017   (JP) .............................. JP2017-188089

(51) Int. Cl.
*H02K 1/28*    (2006.01)
*H02K 1/27*    (2022.01)
(Continued)

(52) U.S. Cl.
CPC ............ *H02K 1/2773* (2013.01); *B25J 9/126* (2013.01); *B62M 9/00* (2013.01); *H02K 1/28* (2013.01);
(Continued)

(58) Field of Classification Search
None
See application file for complete search history.

(56) References Cited

U.S. PATENT DOCUMENTS 10,763,714 B2    9/2020  Kawamoto et al.
2010/0001605 A1*  1/2010  Tajima ................ H02K 21/044
                                                 310/156.22
(Continued)

FOREIGN PATENT DOCUMENTS

CN    204279851 U  *  4/2015
CN    105490412 A  *  4/2016  ........... H02K 1/2773
(Continued)

OTHER PUBLICATIONS

Machine Translation of CN_105490412_A (Year: 2016).*
(Continued)

*Primary Examiner* — Tran N Nguyen
(74) *Attorney, Agent, or Firm* — Hauptman Ham, LLP

(57) ABSTRACT

According to one aspect of the present disclosure, a rotor includes a plurality of permanent magnets and a support supporting the permanent magnet. The support includes at least one of an outside support fixed to a radial outside of the outer cores to circumferentially support an end face of the permanent magnet from both sides and an inside support fixed to a radial inside of the outer cores to circumferentially support the end face of the permanent magnet from both sides. Each of the outer cores includes an opposite face parallelly opposed to the end face of the permanent magnet in the circumferential direction. The outside support and the inside support each includes a support face circumferentially supporting the end face. The support face is disposed on a side closer to a center line of the permanent magnet than the opposite face in the circumferential direction.

19 Claims, 13 Drawing Sheets

(51) Int. Cl.
    *H02K 21/16*     (2006.01)
    *H02K 1/276*     (2022.01)
    *B25J 9/12*     (2006.01)
    *B62M 9/00*     (2006.01)
    *B62M 6/40*     (2010.01)
    *B64C 39/02*     (2006.01)
    *H02K 29/03*     (2006.01)

(52) U.S. Cl.
    CPC ............... *H02K 21/16* (2013.01); *B62M 6/40* (2013.01); *B64C 39/024* (2013.01); *B64C 2201/027* (2013.01); *B64C 2201/042* (2013.01); *H02K 29/03* (2013.01)

(56) References Cited

U.S. PATENT DOCUMENTS

| | | | |
|---|---|---|---|
| 2012/0059520 A1* | 3/2012 | Kossett | B62D 57/02 700/264 |
| 2012/0326548 A1 | 12/2012 | Nonaka | |
| 2013/0119808 A1 | 5/2013 | Hirokawa et al. | |
| 2013/0328432 A1* | 12/2013 | Hoemann | H02K 1/30 310/156.12 |
| 2017/0126081 A1* | 5/2017 | Kim | H02K 1/30 |

FOREIGN PATENT DOCUMENTS

| | | | | |
|---|---|---|---|---|
| DE | 102016208983 A1 | * | 12/2016 | ............. H02K 15/12 |
| DE | 102015222887 A1 | * | 5/2017 | ............. B60K 6/387 |
| JP | H7-312852 A | | 11/1995 | |
| JP | 2000-152534 A | | 5/2000 | |
| JP | 2013-21844 A | | 1/2013 | |
| WO | WO-2017076461 A | * | 5/2017 | ............... H02K 1/28 |

OTHER PUBLICATIONS

Machine Translation of CN_204279851_U (Year: 2015).*
Machine Translation of DE_102015222887_A1 (Year: 2017).*
Machine Translation of DE_102016208983_A1 (Year: 2016).*

* cited by examiner

… (1)

ROTOR, SPOKE TYPE MOTOR, VEHICLE MOTOR, UNMANNED FLYING BODY, ELECTRIC ASSIST DEVICE, AND ROBOT DEVICE

CROSS-REFERENCE TO RELATED APPLICATIONS

This is the U.S. national stage of application No. PCT/JP2018/036372, filed on Sep. 28, 2018, and priority under 35 U.S.C. § 119(a) and 35 U.S.C. § 365(b) is claimed from Japanese Application No. 2017-188089, filed on Sep. 28, 2017.

FIELD OF THE INVENTION

The present disclosure relates to a rotor, a spoke type motor, a vehicle motor, an unmanned flying body, an electric assist device, and a robot device.

BACKGROUND

In the spoke type motor, it is necessary to adopt a structure that prevents a permanent magnet from scattering due to centrifugal force during rotation of a rotor. A structure that prevents the permanent magnet from scattering by inserting the permanent magnet into a rotor core has been known. A structure that prevents the permanent magnet from jumping out in an outer circumferential direction by providing a protrusion that protrudes inside an opening of an insertion groove at a position on a radial outside of the permanent magnet has been known.

However, in the structure described above, the insertion hole of the rotor core is designed with a size larger than that of the permanent magnet in order to insert the permanent magnet. In this case, sometimes the permanent magnet is located close to a forward rotation direction (clockwise direction) or a reverse rotation direction (counterclockwise direction) in a circumferential direction of the rotor core. When the side where the permanent magnet approaches is not kept constant, a distance from the core varies, which leads to degradation of cogging torque.

In the structure described above, because the protrusion is provided in a yoke, there is a risk of generating a magnetic flux to decrease torque. As a result, a magnetic flux distribution is disturbed to lead to the degradation of the cogging torque. In order to prevent the permanent magnet from scattering without providing the protrusion, it is conceivable to support the permanent magnet by a support provided by resin mold. In the resin mold, a weld line is molded by joining the ends of a molten resin material in which a temperature is lowered. Strength of a place where the weld line is generated is lower than that of other parts. When the weld line is molded on the support to decrease the strength, there is a possibility that the support is deformed by the centrifugal force associated with the rotation of the rotor. The cogging torque is degradated when the position of the permanent magnet varies due to the deformation of the support.

SUMMARY

According to a first aspect of the present disclosure, a rotor includes: a shaft disposed along a center axis extending in a vertical direction; a rotor core including an inner core disposed along a circumferential direction on a radial outside of the shaft and a plurality of outer cores disposed away from each other along the circumferential direction on the radial outside of the inner core; a plurality of permanent magnets disposed alternately with the outer cores in the circumferential direction on the radial outside of the shaft, the permanent magnets exciting the outer cores; and a support supporting the permanent magnet. The support includes at least one of an outside support fixed to a radial outside of the outer core to circumferentially support an end face of the permanent magnet from both sides and an inside support fixed to a radial inside of the outer cores to circumferentially support the end face of the permanent magnet from both sides, each of the outer cores include an opposite face opposed parallel to the end face of the permanent magnet in the circumferential direction, the outside support and the inside support each includes a support face circumferentially supporting the end face, and the support face is disposed on a side closer to a center line of the permanent magnet than the opposite face in the circumferential direction.

According to a second aspect of the present disclosure, a spoke type motor includes: a stator; and the rotor of the first aspect, which is rotatable about the center axis relative to the stator.

According to a third aspect of the present disclosure, a vehicle motor includes the spoke type motor of the second aspect as a motor that drives a dual clutch transmission.

According to a fourth aspect of the present disclosure, an unmanned flying body includes the spoke type motor of the second aspect.

According to a fifth aspect of the present disclosure, an electric assist device includes the spoke type motor of the second aspect.

According to a sixth aspect of the present disclosure, a robot device includes the spoke type motor of the second aspect.

The above and other elements, features, steps, characteristics and advantages of the present disclosure will become more apparent from the following detailed description of the preferred embodiments with reference to the attached drawings.

DETAILED DESCRIPTION

Figure 1:
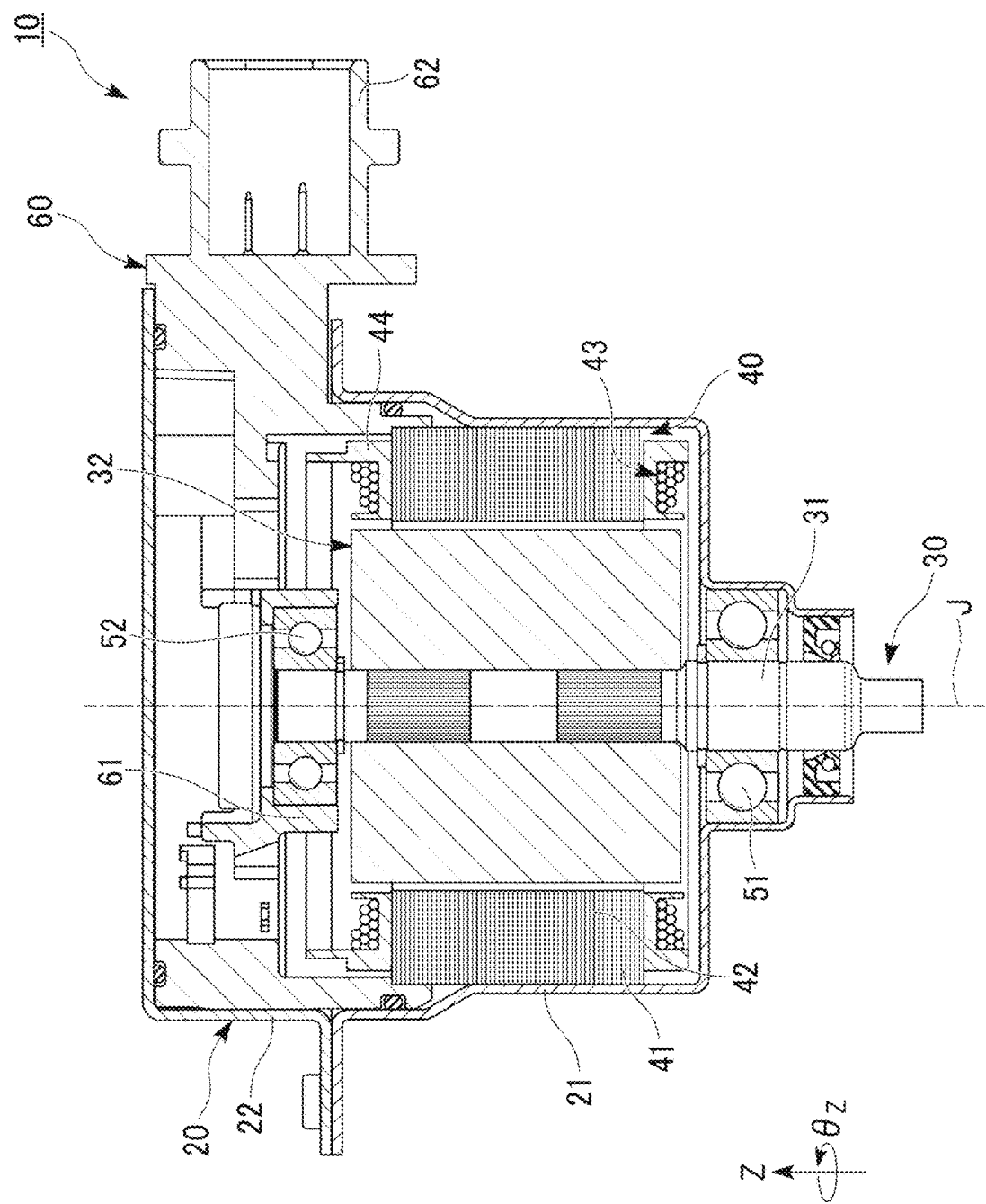
FIG. 1 is a sectional view illustrating a motor according to a first embodiment.

Hereinafter, a rotor, a spoke type motor, a vehicle motor, an unmanned flying body, an electric assist device, and a robot device according to embodiments of the present disclosure will be described with reference to the drawings. The scope of the present disclosure is not limited to the following embodiments, but includes any modification thereof within the scope of the technical idea of the present disclosure. Scales, numbers, and like of members or portions illustrated in the following drawings may differ from those of actual members or portions for the sake of easier understanding of the members or portions.

In the drawings, a Z-axis direction is illustrated as appropriate. The Z-axis direction in each drawing is a direction parallel to an axial direction of a center axis J in FIG. 1. A circumferential direction about the center axis J is set to a θZ-direction. In the θZ-direction, a counterclockwise direction is set to a positive direction when viewed from a +Z-side to a −Z-side, and a clockwise direction is set to a negative direction when viewed from the +Z-side to the −Z-side.

In the following description, it is assumed that a direction in which the center axis J extends (Z-axis direction) is a vertical direction. A positive side (+Z-side) in the Z-axis direction is referred to as an upper side (an axially upper side), and a negative side (−Z-side) in the Z-axis direction is referred to as a lower side. In the following embodiments, the upper side corresponds to one side in the center axis direction, and the lower side corresponds to the other side in the center axis direction. The above definitions of the vertical direction, the upper side, and the lower side are names used only for the purpose of the description, but are not meant to restrict actual relative positions or directions. Unless otherwise explained, a direction (Z-axis direction) parallel to the center axis J is simply referred to as an "axial direction", a radial direction centered on the center axis J is simply referred to as a "radial direction", and the circumferential direction (θZ-direction) centered on the center axis J, namely, a direction around the center axis J is simply referred to as a "circumferential direction".

The side that goes in the positive direction in the θZ-direction (+θZ-side, one side in the circumferential direction) is referred to as a "drive side", and the side that goes in the negative direction in the θZ-direction (−θZ-side, the other side in the circumferential direction) is referred to as a "non-drive side". The drive side and the non-drive side are names used only for the purpose of the description, but are not meant to restrict an actual drive direction.

Further, herein, descriptions such as being axially extended do not only refer to the case of strictly being extended in the axial direction (Z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

FIG. 1 is a sectional view illustrating a spoke type motor 10 (hereinafter, simply referred to as a motor 10). As illustrated in FIG. 1, the motor 10 of the first embodiment includes a housing 20, a rotor 30 including a shaft 31, a stator 40, a lower bearing (bearing) 51, an upper bearing (bearing) 52, and a bus bar unit 60.

The housing 20 accommodates the rotor 30, the stator 40, the lower bearing 51, the upper bearing 52, and the bus bar unit 60. The housing 20 includes a lower housing 21 and an upper housing 22. The lower housing 21 has a cylindrical shape open onto both sides (±Z-side) in the axial direction. The upper housing 22 is fixed to an end of an upper side (+Z-side) of the lower housing 21. The upper housing 22 covers the upper sides of the rotor 30 and the stator 40.

The stator 40 is held inside the lower housing 21. The stator 40 is disposed on a radially outside of the rotor 30. The stator 40 includes a core back 41, a tooth 42, a coil 43, and a bobbin 44. For example, the core back 41 has a cylindrical shape concentric with the center axis J. An outside face of the core back 41 is fixed to an inside face of the lower housing 21.

The tooth 42 extend from the inside face of the core back 41 toward the shaft 31. Although not illustrated in FIG. 1, a plurality of teeth 42 are provided and disposed at equal intervals in the circumferential direction. The bobbin 44 is attached to each tooth 42. The coil 43 is wound around each tooth 42 with the bobbin 44 interposed therebetween.

The bus bar unit 60 is located on the upper side (+Z-side) of the stator 40. The bus bar unit 60 includes a connector 62. An external power supply (not illustrated) is connected to the connector 62. The bus bar unit 60 includes a wiring member electrically connected to the coil 43 of the stator 40. One end of the wiring member is exposed to the outside of the motor 10 through the connector 62. Consequently, power is supplied to the coil 43 from the external power supply through the wiring member. The bus bar unit 60 includes a bearing holder 61.

The lower bearing 51 and the upper bearing 52 support the shaft 31. The lower bearing 51 is located on the lower side (−Z-side) of the stator 40. The lower bearing 51 is held by the lower housing 21. The upper bearing 52 is located on the upper side (+Z-side) of the stator 40. The upper bearing 52 is held by the bearing holder 61 of the bus bar unit 60.

Figure 2:
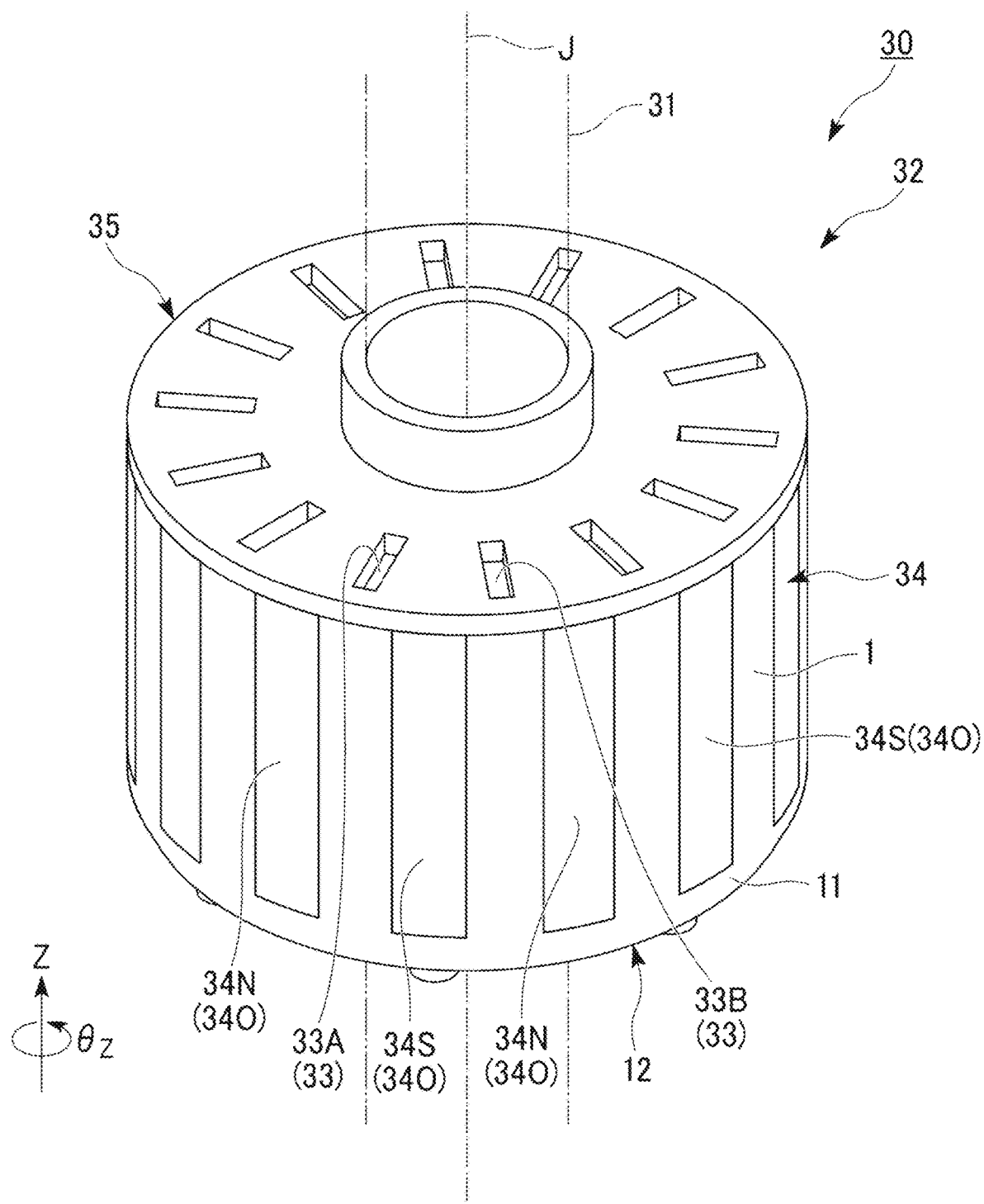
FIG. 2 is a perspective view illustrating a rotor of the first embodiment.

FIG. 2 is a perspective view illustrating the rotor 30. The rotor 30 includes a shaft 31 and a rotor body 32. In the shaft 31, the center is set to the center axis J extending in the vertical direction (Z-axis direction). The rotor body 32 is located on the radial outside of the shaft 31. In the first embodiment, the rotor body 32 is fixed to the outer circumferential face of the shaft 31. In the first embodiment, for example, the rotor 30 rotates counterclockwise about the center axis J, namely, the rotor 30 rotates from the non-drive side (−θZ-side) to the drive side (+θZ-side) when viewed from the upper side (+Z-side).

The rotor body 32 includes a plurality of permanent magnets 33, a rotor core 34, a mold resin unit 12, and a cover member 35. That is, the rotor 30 includes the plurality of permanent magnets 33, the rotor core 34, the mold resin unit 12, and the cover member 35. In the first embodiment, the mold resin unit 12 corresponds to the support.

Figure 3:
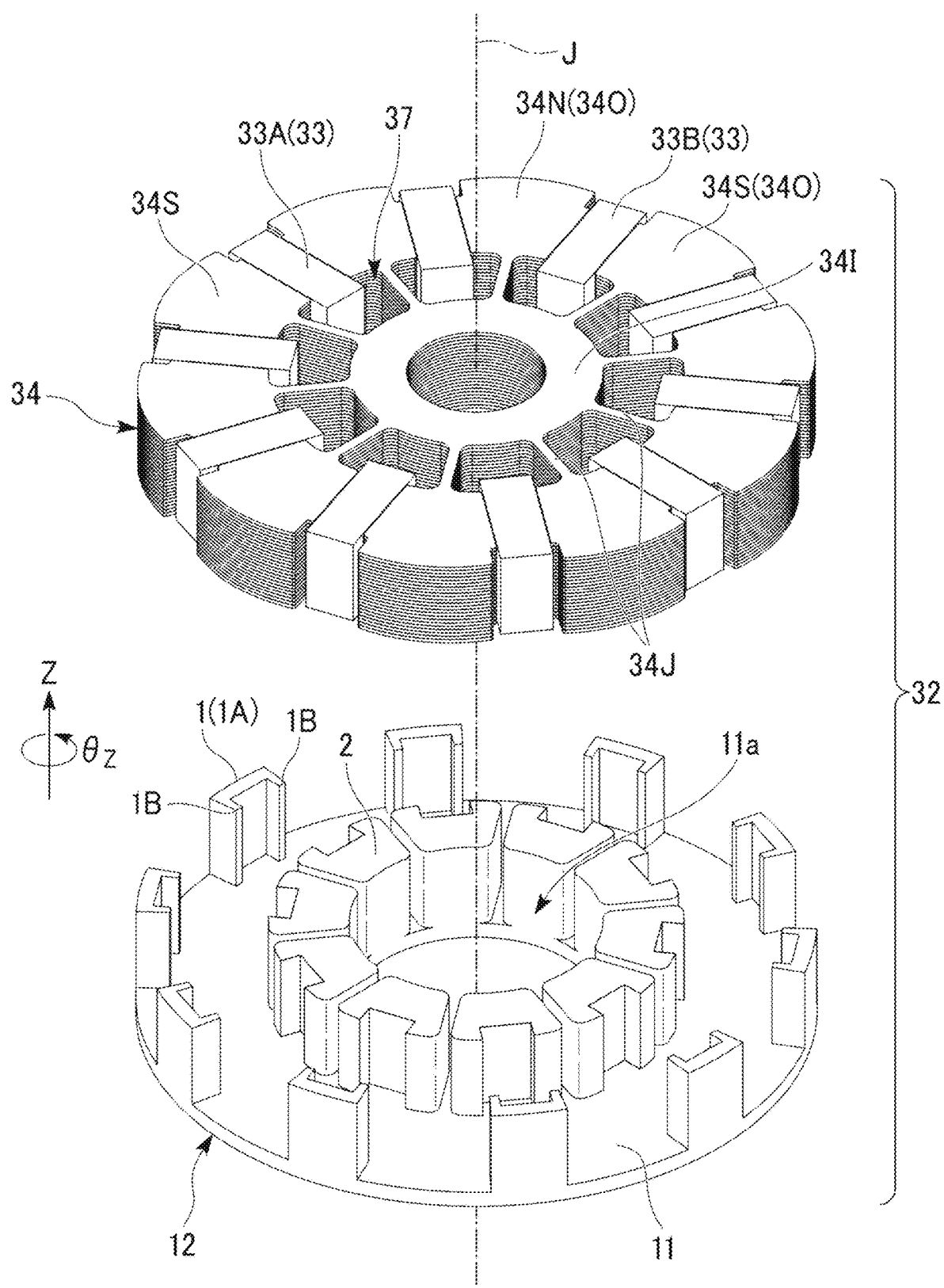
FIG. 3 is an exploded perspective view illustrating a rotor body of the first embodiment.
Figure 4:
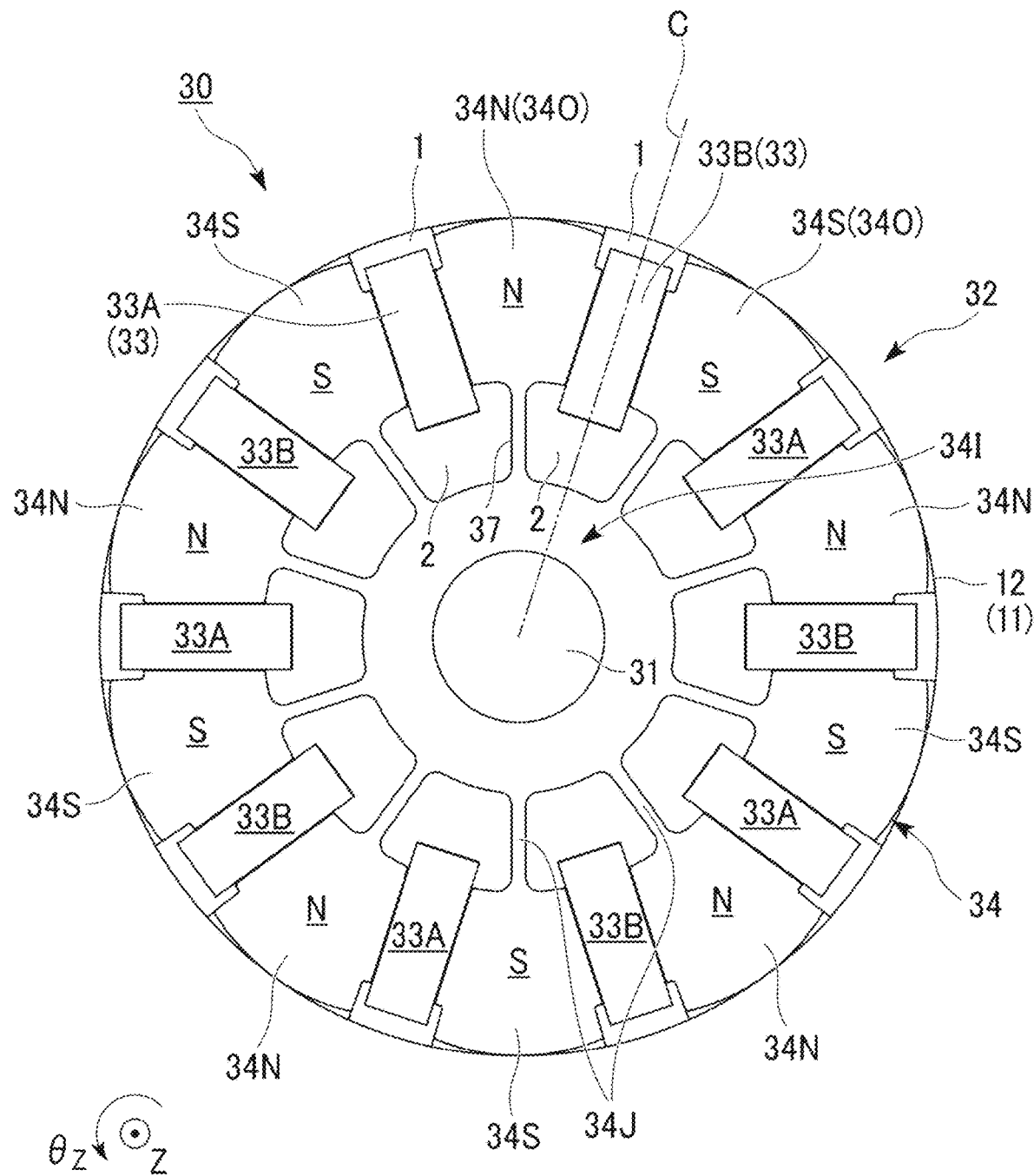
FIG. 4 is a view illustrating the rotor body of the first embodiment as viewed from above.
Figure 5:
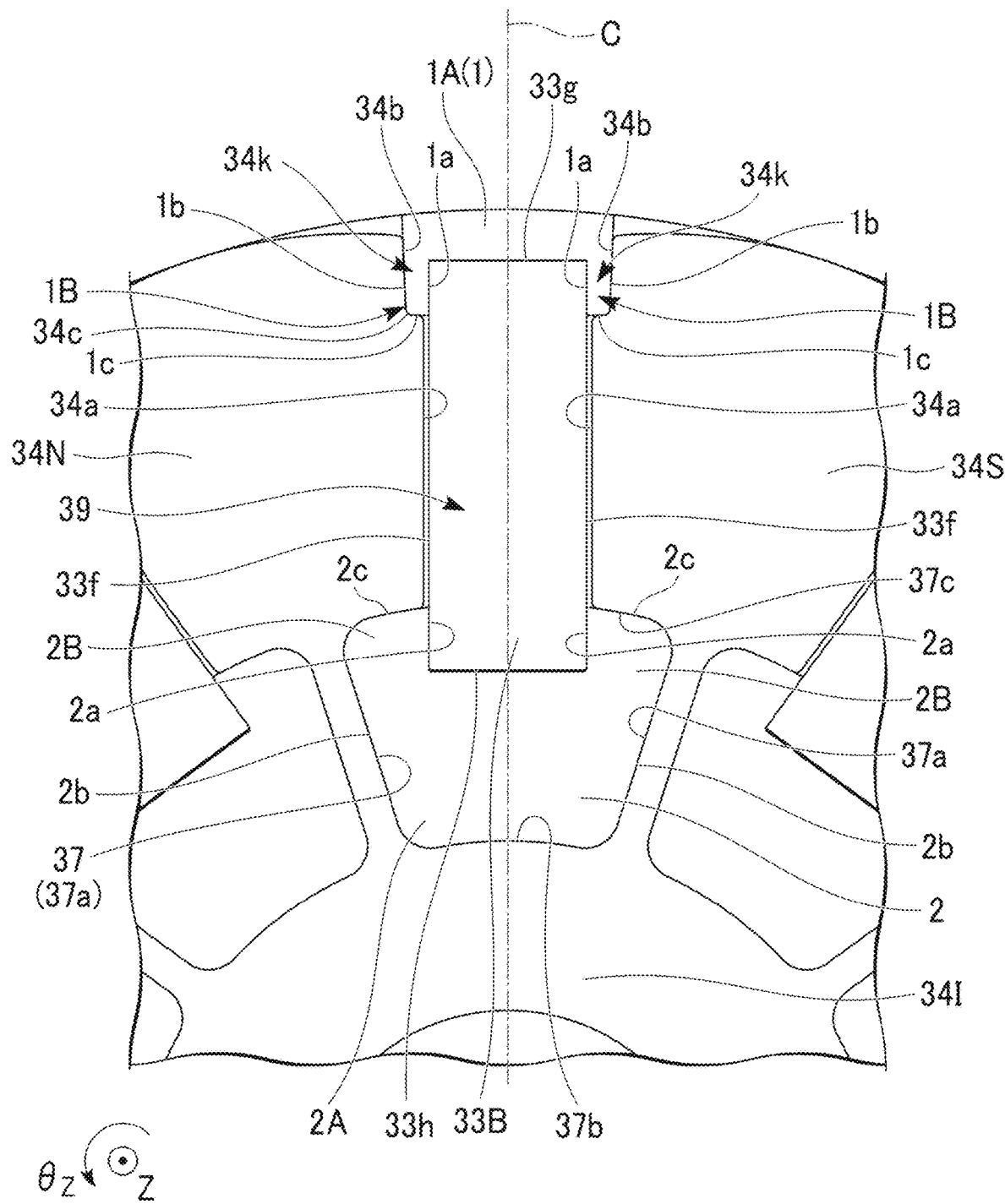
FIG. 5 is a partially enlarged view of FIG. 4.

FIG. 3 is an exploded perspective view of the rotor body 32. FIG. 4 is a view illustrating the rotor body 32 as viewed from above. FIG. 5 is a partially enlarged view of FIG. 4. In FIGS. 3 to 5, the cover member 35 is omitted.

The permanent magnet 33 excites an outer core 34O (to be described later) in the rotor core 34. As illustrated in FIGS. 3 and 4, the permanent magnets 33 and the outer cores 34O are alternately arranged in the circumferential direction. The permanent magnet 33 is inserted into a permanent magnet insertion hole 39 (to be described later). The permanent magnet 33 includes permanent magnets 33A, 33B. The permanent magnets 33A and the permanent magnets 33B are alternately arranged along the circumferential direction. In the following description, sometimes the permanent magnet 33A and the permanent magnet 33B are representatively described as the permanent magnet 33. In each drawing, a center line C passing through the center of the permanent magnet 33 in the circumferential direction is illustrated as appropriate.

The permanent magnets 33A, 33B have two magnetic poles disposed along the circumferential direction. For example, the permanent magnet 33A has an S pole on the drive side (+θZ-side) and an N pole on the non-drive side (−θZ-side). For example, the permanent magnet 33B has the N pole on the drive side (+θZ-side) and the S pole on the non-drive side (−θZ-side). Consequently, in the magnetic poles of the permanent magnets 33A, 33B adjacent to each other in the circumferential direction, the same poles are opposed to each other in the circumferential direction.

The permanent magnet 33A and the permanent magnet 33B have the same configuration except that the permanent magnet 33A and the permanent magnet 33B differ from each other in the arrangement of magnetic poles in the circumferential direction. For this reason, in the following description, sometimes only the permanent magnet 33A is described as a representative.

The permanent magnet 33A extends in the radial direction. For example, a sectional shape orthogonal to the axial direction (Z-axis direction) of the permanent magnet 33A is a rectangular shape. In the description, the rectangular shape includes a substantially rectangular shape. For example, the substantially rectangular shape includes a state in which rectangular corners are chamfered.

In the first embodiment, for example, five permanent magnets 33A are provided. For example, five permanent magnets 33B are provided.

The rotor core 34 includes an inner core 34I, the outer core 34O, and a plurality of spokes 34J that extend in the radial direction to connect the inner core 34I and the outer core 34O. The inner core 34I is located on the radial outside of the shaft 31 and on the radial insides of the permanent magnets 33A, 33B. The inner core 34I is provided in an annular shape along the circumferential direction. The rotor core 34 includes a cavity 37 on the radial insides of the permanent magnets 33A, 33B. The cavity 37 is a flux barrier preventing magnetic flux leakage. The cavity 37 is provided between the spokes 34J adjacent to each other in the circumferential direction.

As illustrated in FIG. 5, an inner face of the cavity 37 includes a side face 37a, a side face 37b, and a side face 37c. The side face 37a extends along the radial direction. The side faces 37a are provided on the +θZ-side and the −θZ-side of the center line C. A circumferential angle where the side face 37a on the +θZ-side intersects with the center line C is identical to a circumferential angle where the side face 37a on the −θZ-side intersects with the center line C. At a radial position of an end face 33h on the radial insides of the permanent magnets 33A, 33B, a distance between the center line C and the side face 37a is longer than a distance between the center line C and the circumferential end of the end face 33h.

The side face 37b and the side face 37c are concentric arc shapes centered on the center axis J as viewed in the axial direction. The side face 37b is disposed closer to the radial inside than the end face 33h on the radial insides of the permanent magnets 33A, 33B. The side face 37c is disposed closer to the radial outside than the end face 33h on the radial insides of the permanent magnets 33A, 33B. The side face 37c intersects with circumferential end faces 33f of the permanent magnets 33A, 33B as viewed in the axial direction. That is, the circumferential end faces 33f of the permanent magnets 33A, 33B are disposed in the cavity 37 as viewed in the axial direction. The side face 37a and the side face 37b are connected to each other by a circular arc as viewed in the axial direction. The side face 37a and the side face 37c are connected to each other by a circular arc as viewed in the axial direction.

As illustrated in FIG. 4, the outer core 34O includes core pieces 34N, 34S. The core pieces 34N, 34S are disposed separately from each other along the circumferential direction on the radial outside of the shaft 31. The core piece 34N and the core piece 34S are alternately arranged along the circumferential direction. The core piece 34N is located between the N pole of the permanent magnet 33A and the N pole of the permanent magnet 33B. Consequently, the core piece 34N is excited to the N pole. The core piece 34S is located between the S pole of the permanent magnet 33A and the S pole of the permanent magnet 33B. Consequently, the core piece 34S is excited to the S pole.

As illustrated in FIG. 5, a permanent magnet insertion hole 39 is circumferentially disposed between the core pieces 34N, 34S adjacent to each other. The permanent magnet insertion hole 39 is a hole into which the permanent magnet 33 is inserted. The permanent magnet insertion hole 39 is adjacent to the core pieces 34N, 34S adjacent to each other in the circumferential direction. The core pieces 34N, 34S include opposite faces 34a opposed to the permanent magnets 33A, 33B in the circumferential direction, respectively. That is, the opposite face 34a is a part of the inner face of the permanent magnet insertion hole 39. The circumferential distance from the circumferential center line C of the permanent magnets 33A, 33B to the opposite face 34a is longer than the circumferential distance from the center line C to the end face 33f of the permanent magnets 33A, 33B. An end face (outer end) 33g of the permanent magnets 33A, 33B on the side farther from the center axis J in the radial direction protrudes outward in the radial direction from the opposite face 34a.

As illustrated in FIG. 5, each of the core pieces 34N, 34S adjacent to each other in the circumferential direction includes a notch 34k. The notches 34k are provided at the ends on the radial outsides of the core pieces 34N, 34S. The notches 34k are provided at the circumferential ends of the core pieces 34N, 34S. The notches 34k are provided in the whole of the axial direction of the core pieces 34N, 34S.

An end 34b on the side farther from the center line C in the circumferential direction of the notch 34k extends along the radial direction. The circumferential distance from the center line C to the end 34b is longer than the circumferential distance from the center line C to the opposite face 34a. An end 34c on the side closer to the center axis J in the radial direction of the notch 34k extends in a direction orthogonal to the center line C. The radial distance from the center axis J to the end 34c is shorter than the distance to the end faces 33g of the permanent magnets 33A, 33B.

The mold resin unit 12 supports the permanent magnets 33A, 33B. As illustrated in FIG. 3, the mold resin unit 12 includes a disc 11, an outside support 1, and an inside support 2. The disc 11 is disposed on the lower side in the axial direction of the rotor core 34. The disc 11 includes a through-hole 11a centered on the center axis J. The disc 11 has a ring shape as viewed in the axial direction. A diameter of the through-hole 11a is larger than an outer diameter of the inner core 34I. The radial distance from the center axis J to the inner circumferential face of the through-hole 11a is longer than the radial distance from the center axis J to the side face 37b of the cavity 37.

The outside support 1 protrudes radially upward from the disc 11. A length by which the outside support 1 protrudes from the disc 11 is substantially equal to an axial height of the permanent magnets 33A, 33B. As illustrated in FIG. 5, the outside support 1 has a square, substantial U-shape including an opening on the radial inside as viewed in the axial direction. The outside support 1 includes a first wall 1A and a second wall 1B. The first wall 1A covers the end faces 33g on the radial outsides of the permanent magnets 33A, 33B. The first wall 1A of the outside support 1 covers the end faces 33g on the radial outsides of the permanent magnets 33A, 33B, so that the permanent magnets 33A, 33B can be prevented from scattering radially outward due to centrifugal force. The outer circumferential face of the first wall 1A has the same diameter as the outer circumferential face of the disc 11.

The second wall 1B protrudes radially inward from both circumferential ends of the first wall 1A. The second wall 1B includes a support face 1a, a support face 1b, and a support face 1c. The support face 1a is circumferentially disposed on the side closer to the center line C. The support face 1b is circumferentially disposed on the side farther from the center line C. The support face 1c is disposed on the radial inside. The support face 1b is covered from the side farther from the center line C at the end 34b of the notch 34k while the outside support 1 is disposed in the notch 34k of the core pieces 34N, 34S. The support face 1c is covered from the radial inside at the end 34c of the notch 34k while the outside support 1 is disposed in the notch 34k of the core pieces 34N, 34S. That is, the support faces 1b, 1c are covered and supported by the ends 34b, 34c while disposed in the notches 34k of the core pieces 34N, 34S, whereby the outside support 1 is fixed to the radial outsides of the core pieces 34N, 34S.

The support face 1a of the second wall 1B is disposed closer to the center line C in the circumferential direction than the opposite faces 34a of the core pieces 34N, 34S. The support face 1a circumferentially supports the end faces 33f of the permanent magnets 33A, 33B on the radial outside. The permanent magnets 33A, 33B are press-fitted in the support face 1a.

As illustrated in FIG. 3, the inside support 2 protrudes axially upward from the disc 11. The length by which the inside support 2 protrudes from the disc 11 is substantially equal to that of the outside support 1. As illustrated in FIG. 5, the inside support 2 has the square, substantial U-shape including an opening on the radial outside as viewed in the axial direction. The inside support 2 includes a first wall 2A and a second wall 2B. The first wall 2A covers the end faces 33h on the radial insides of the permanent magnets 33A, 33B.

The second wall 2B protrudes radially outward from both circumferential ends of the first wall 2A. The second wall 2B includes a support face 2a, a support face 2b, and a support face 2c. The support face 2a is circumferentially disposed on the side closer to the center line C. The support face 2b is circumferentially disposed on the side farther from the center line C. The support face 2c is disposed on the radial outside. The support face 2b is covered with the side face 37a from the side farther from the center line C while the inside support 2 is disposed in the cavity 37. The support face 2c is covered with the side face 37c from the radial outside while the inside support 2 is disposed in the cavity 37. That is, the support faces 2b, 2c are covered with and supported by the side faces 37a, 37c while disposed in the cavity 37, whereby the inside support 2 is fixed to the radial insides of the core pieces 34N, 34S The support face 2a of the second wall 2B is circumferentially disposed closer to the center line C than the opposite faces 34a of the core pieces 34N, 34S. The support face 2a circumferentially supports the end faces 33f of the permanent magnets 33A, 33B on the radial inside. The permanent magnets 33A, 33B are press-fitted in the support face 2a.

In the end faces 33f of the permanent magnets 33A, 33B, the radial end is supported from both sides in the circumferential direction by the outside support 1 and the inside support 2 while being in a non-constrained state in which the radial end is separated from the opposite faces 34a of the core pieces 34N, 34S. When the whole end faces 33f of the permanent magnets 33A, 33B are supported by the opposite face 34a of the core pieces 34N, 34S, there is a possibility that the end face 33f and the opposite face 34a are locally separated due to a manufacturing error and the like. In this case, there is a possibility that the permanent magnets 33A, 33B are supported while biased in the circumferential direction. Regions where the support face 1a of the outside support 1 and the support face 2a of the inside support 2 support the end faces 33f of the permanent magnets 33A, 33B are local. For this reason, the support face 1a and the support face 2a can be manufactured with high accuracy. Thus, the permanent magnets 33A, 33B can circumferentially be supported without generating a circumferential bias. By circumferentially supporting the permanent magnets 33A, 33B without generating the circumferential bias, the degradation of the cogging torque due to the disturbance of the magnetic flux distribution can be prevented even when the rotor 30 rotates.

As illustrated in FIG. 2, the cover member 35 covers at least a part of the upper side of the mold resin unit 12. The cover member 35 is fixed to the mold resin unit 12 by a snap-fit. The cover member 35 is fixed to the outside support 1 by the snap-fit. As an example, the cover member 35 is fixed to the outside support 1 by a plurality of snap-fits. As an example, the snap-fit is disposed along the circumferential direction for each of the core pieces 34N, 34S.

For example, the snap-fit includes a hook (not illustrated) provided in the cover member 35 and a catching unit (not illustrated) provided in the rotor core 34. As an example, the hook includes an arm (not illustrated) extending downward from the cover member 35 and a claw (not illustrated) protruding radially inward from the lower end of the arm. An inclination that goes toward the upper side as it goes toward the radial inside is provided in a lower face of the claw. As an example, the catching unit includes a cavity (not illustrated) provided on the radial inside of the inside support 2 provided in the inner core 34I, a notch (not illustrated) disposed on the radial inside of the cavity and on the radial lower side of the inner core 34I, and a catching wall (not illustrated) that is disposed above the notch in the inner core 34I and protrudes radially outward. A circumferential width of the cavity is longer than a circumferential width of the hook and shorter than the shortest width in the circumferential direction of the inside support 2. A radial width of the cavity is longer than a radial width of the hook.

While the hook, the cavity, and the catching unit are aligned in the circumferential direction, when the cover member 35 and the mold resin unit 12 are brought close to each other to insert the hook into the cavity, the lower inclination of the claw comes into contact with the catching wall. The inclination of the claw contacts with the catching wall to elastically deform the arm onto the radial outside. When approach between the cover member 35 and the mold resin unit 12 proceeds to dispose the claw below the catching wall, the claw is disposed in the notch by elastic restoring force. The claw is disposed in the notch part, the claw and the catching wall overlap each other in the axial direction by disposing the claw in the notch. The cover member 35 is fixed to the mold resin unit 12 when the claw and the catching wall overlap each other in the axial direction to catch the claw in the catching wall from below.

Because the disc 11 of the mold resin unit 12 covers at least a part of the lower side of the rotor core 34 as a cover on the lower side in the axial direction, it is not necessary to separately provide the lower cover member. The cover member 35 is fixed to the mold resin unit 12 by the snap-fit, so that the efficiency of the assembly work can be improved.

The rotor 30 of the first embodiment is manufactured through processes including an installation process, a molded body formation process, a permanent magnet arrangement process, and a cover member fixing process.

The installation process is a process of installing the shaft 31 and the rotor core 34 in a metal mold. The order of installation in the mold is not particularly limited, but the rotor core 34 may previously be installed, the shaft 31 may previously be installed, or the rotor core 34 and the shaft 31 may simultaneously be installed.

In the molded body forming process, the molten resin material is poured into the metal mold from a gate provided in the metal mold, and the molten resin material is cooled and solidified, and the mold resin unit 12 formed by releasing the resin material from the metal mold by an ejector mechanism including an ejector pin. The mold resin unit 12 is coupled and fixed to the shaft 31 and the rotor core 34.

Figure 6:
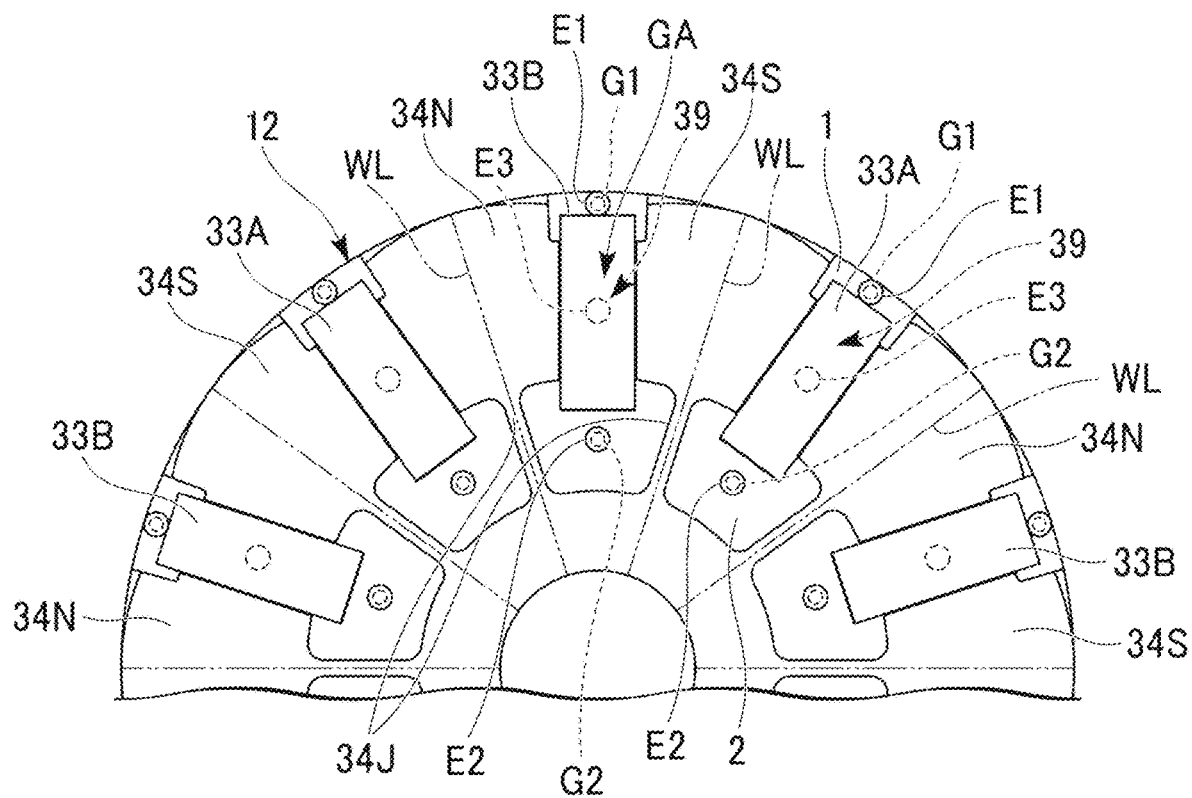
FIG. 6 is a partial plan view illustrating a mold resin unit portion of the first embodiment molded in a molded body forming step as viewed in an axial direction.

FIG. 6 is a partial plan view illustrating the mold resin unit 12 molded by the molded body forming process as viewed in the axial direction. In the molded body forming process, the metal mold is filled with the molten resin material from the gate, and the mold resin unit 12 is protruded from the metal mold by the ejector mechanism. After the molded body forming process, the mold resin unit 12 has gate marks G1, G2 and ejector marks E1, E2, E3. The gate marks G1, G2 are disposed on the lower side in the axial direction of the mold resin unit 12. The ejector marks E1, E2, E3 are disposed on the upper side in the axial direction of the mold resin unit 12. The gate marks G1, G2 may be disposed on the upper side in the axial direction of the mold resin unit 12, and the ejector marks E1, E2, E3 may be disposed on the lower side in the axial direction of the mold resin unit 12. The gate marks G1, G2 and the ejector marks E1, E2, E3 may be disposed on the same side in the axial direction. In the mold resin unit 12, the upper side in the axial direction is a region facing the upper side in the axial direction. In the mold resin unit 12, the lower side in the axial direction is a region facing the lower side in the axial direction.

An injection molding machine in which the metal mold is installed in the molded body forming process includes a supply mechanism and an ejector mechanism. The supply mechanism is a mechanism that supplies (injects) the molten resin material into the metal mold through the gate. The ejector mechanism is a mechanism that protrudes the mold resin unit 12 from the metal mold by driving the ejector mechanism provided in the metal mold. Because the supply mechanism and the ejector mechanism are usually disposed on the opposite sides in the axial direction, preferably the gate marks G1, G2 and the ejector marks E1, E2, E3 are disposed on the opposite sides in the axial direction. Because the gate marks G1, G2 and the ejector marks E1, E2, E3 are disposed on the opposite sides in the axial direction, it is not necessary to provide a complicated structure of the metal mold.

The gate marks G1, G2 are disposed in a region GA including a space between the outer cores 34O adjacent to each other in the circumferential direction and a space between the spokes 34J adjacent to each other in the circumferential direction. A plurality of regions GA are provided along the circumferential direction. The gate marks G1, G2 are disposed in all regions GA. Because the gate marks G1, G2 are disposed in all the regions GA, a weld line WL formed in the forming body forming process is circumferentially disposed away from the region GA as indicated by a two-dot chain line in FIG. 6. That is, the weld line WL is circumferentially disposed away from the outside support 1 and the inside support 2 disposed in the region GA.

The weld line WL is molded by joining the ends of the molten resin material in which a temperature is lowered. The strength of the place where the weld line WL is generated is lower than that of other parts. When the weld line WL is molded in the outside support 1 and the inside support 2 to decrease the strength, there is a possibility that at least one of the outside support 1 and the inside support 2 is deformed by the centrifugal force associated with the rotation of the rotor 30. The outside support 1 and the inside support 2 are deformed to vary the positions of the permanent magnets 33A, 33B, which occasionally leads to the degradation of the cogging torque. Because the weld line WL is circumferentially molded away from the outside support 1 and the inside support 2, the degradation of the cogging torque due to the decrease in strength of the outside support 1 and the inside support 2 is prevented to achieve less vibration.

When the weld line WL is molded on the outside support 1 and the inside support 2 to decrease the strength, there is a possibility that at least one of the outside support 1 and the inside support 2 is damaged from the weld line WL by the centrifugal force associated with the rotation of the rotor 30. In the rotor 30 of the first embodiment, the weld line WL is circumferentially molded away from the outside support 1 and the inside support 2, so that the damage to the outside support 1 and the inside support 2 can be prevented.

The gate mark G1 is disposed at a position overlapping the outside support 1 as viewed in the axial direction. The gate mark G1 is disposed at a position overlapping the outside support 1 as viewed in the axial direction, so that the outside support 1 can be molded without generating the weld line WL before joining the molten resin material from another gate in the molded body forming process.

The term "the gate mark G1 overlaps the outside support 1 as viewed in the axial direction" means that at least a part of the gate mark G1 overlaps the outside support 1 as viewed in the axial direction. When a part of the gate mark G1 overlaps the outside support 1 as viewed in the axial direction, a part of the molten material introduced from the gate in the molded body forming process is dammed in a different region from the outside support 1, so that an influence of jetting can be prevented.

The gate mark G2 is disposed at the position overlapping the inside support 2 as viewed in the axial direction. The gate mark G2 is disposed at the position overlapping the inside support 2 as viewed in the axial direction, so that the inside support 2 can be filled and molded before joining the molten material from another gate in the molded body forming process. Similarly to the gate mark G1, when a part of the gate mark G2 overlaps the inside support 2 as viewed in the axial direction, the influence of the jetting can be prevented in the molded body forming process.

The ejector mark E1 is disposed at the position overlapping the gate mark G1 as viewed in the axial direction. The outside support 1 extends in the axial direction, and has a large mold release resistance in the molded body forming process. Because the outside support 1 includes the second walls 1B disposed away from each other in the circumferential direction, the mold release resistance associated with material shrinkage is large in the molded body forming process. The ejector mark E1 is axially disposed at the position overlapping the gate mark G1, so that the outside support 1 having the large mold release resistance can smoothly be released from the metal mold without generating the weld line WL.

The ejector mark E2 is disposed at the position overlapping the gate mark G2 as viewed in the axial direction. The inside support 2 extends in the axial direction, and has the large mold release resistance in the molded body forming process. Because the inside support 2 includes the second walls 2B disposed away from each other in the circumferential direction, the mold release resistance associated with material shrinkage is large in the molded body forming process. The ejector mark E2 is axially disposed at the position overlapping the gate mark G2, so that the inside support 2 having the large mold release resistance can smoothly be released from the metal mold without generating the weld line WL.

The ejector mark E3 is disposed at the position overlapping the permanent magnet insertion hole 39 into which the permanent magnets 33A, 33B are inserted as viewed in the axial direction. In the molded body forming process, a core portion of the metal mold used to mold the permanent magnet insertion hole 39 has the large mold release resistance associated with the material shrinkage. The ejector mark E3 is disposed at the position overlapping the permanent magnet insertion hole 39 as viewed in the axial direction, so that a peripheral part of the permanent magnet insertion hole 39 having the large mold release resistance can smoothly be released from the metal mold.

Figure 7:
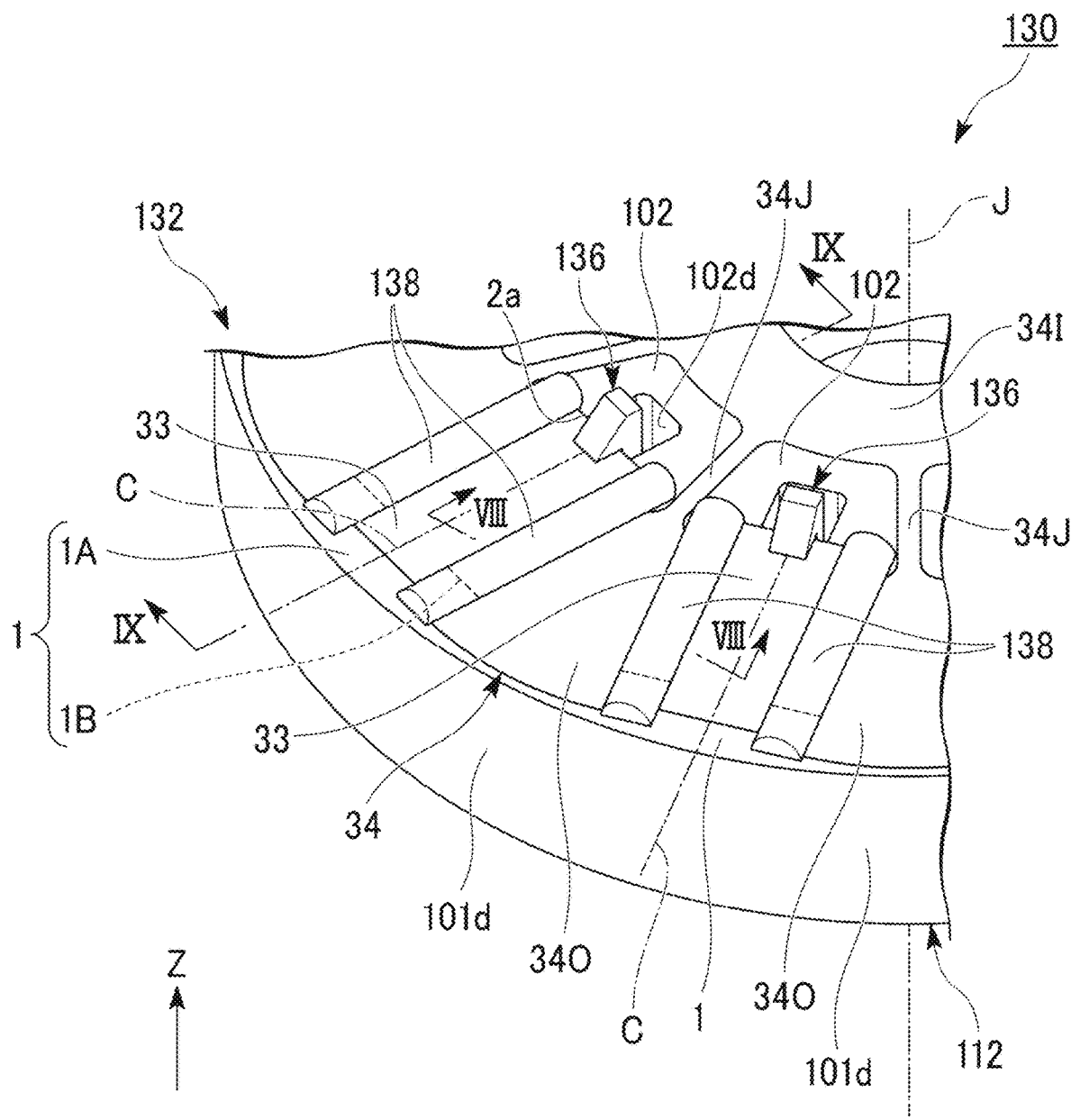
FIG. 7 is a perspective view illustrating a part of a rotor according to a second embodiment.
Figure 8:
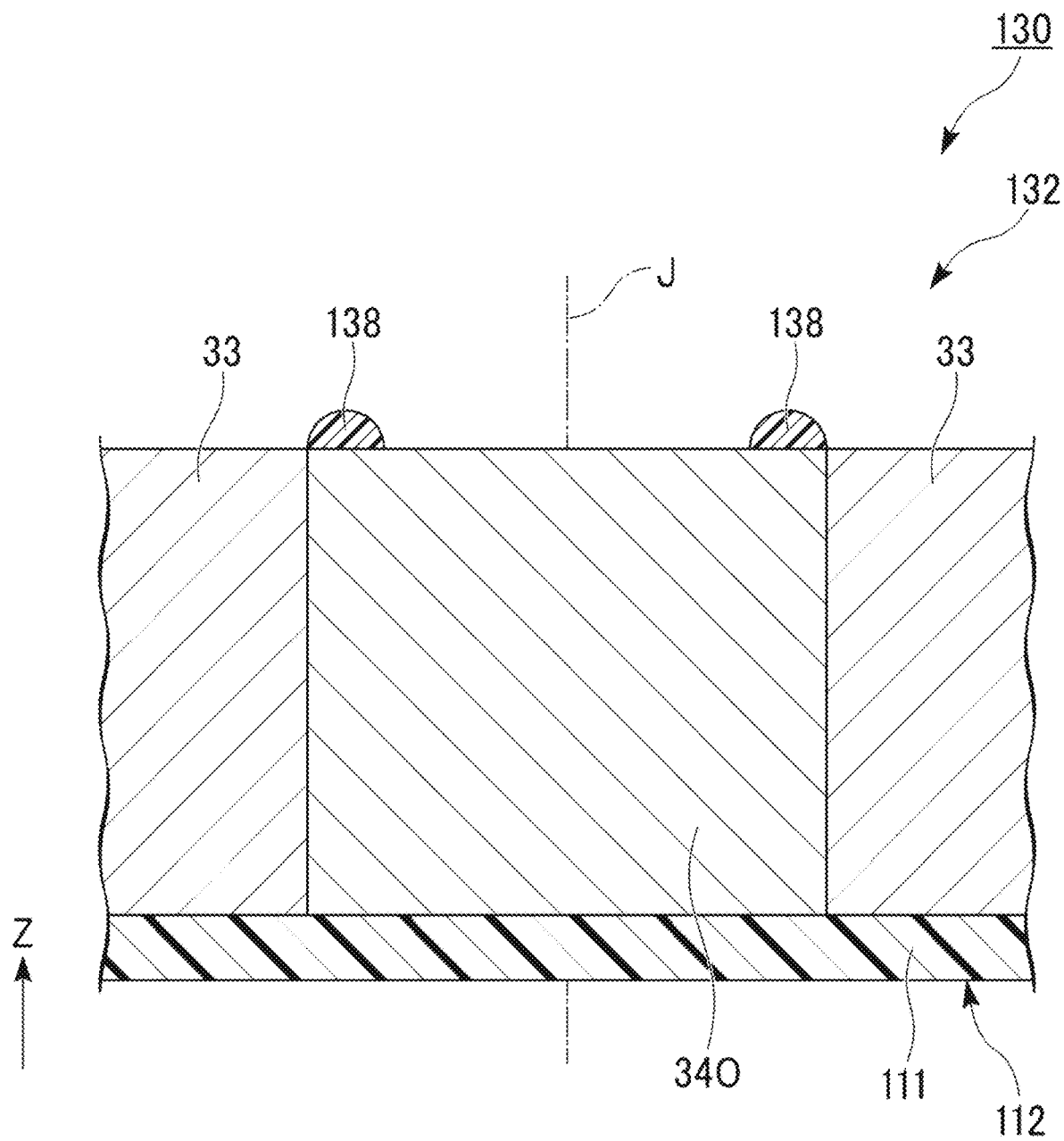
FIG. 8 is a sectional view illustrating a part of the rotor of the second embodiment, and is a sectional view taken along a line VIII-VIII in FIG. 7.
Figure 9:
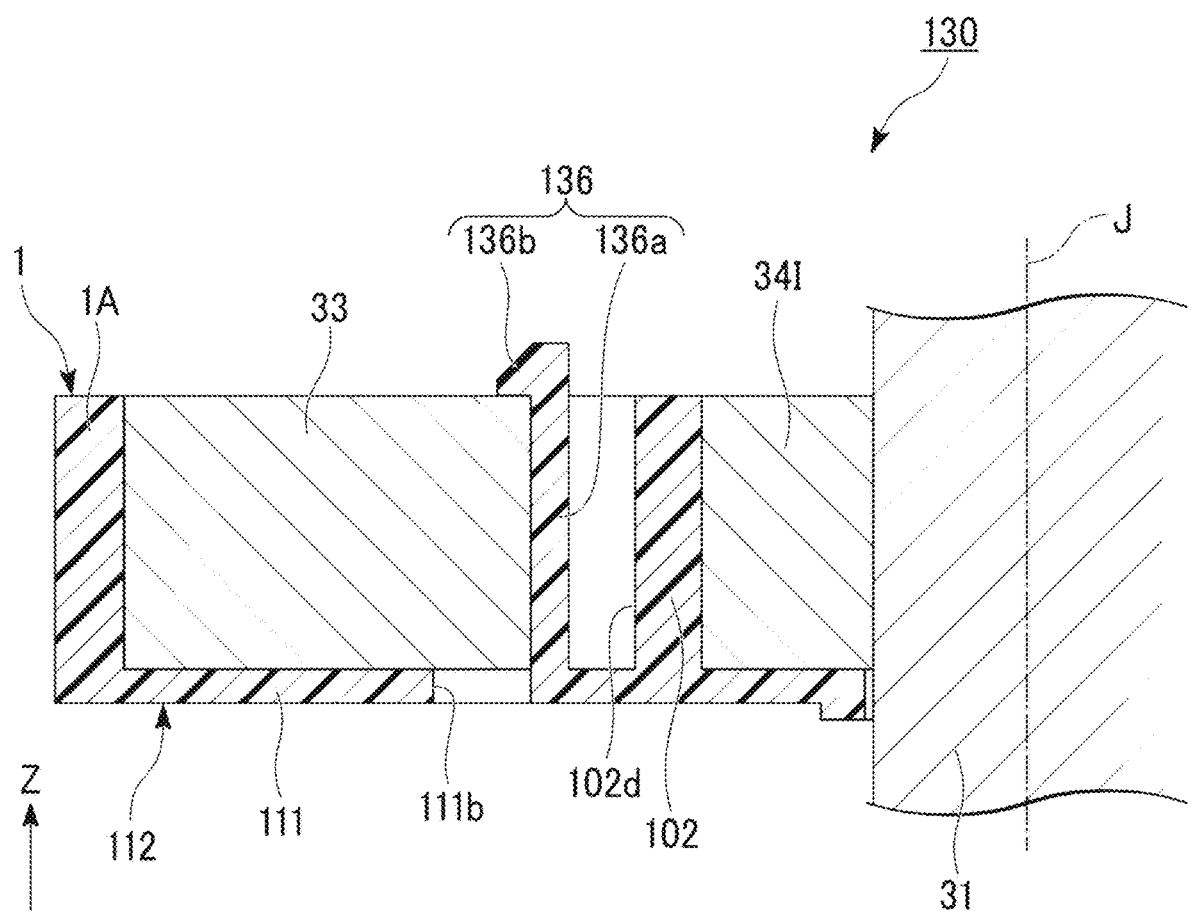
FIG. 9 is a sectional view illustrating a part of the rotor of the second embodiment, and is a sectional view taken along a line IX-IX in FIG. 7.

FIG. 7 is a perspective view illustrating a part of a rotor 130 according to a second embodiment. FIG. 8 is a sectional view illustrating a part of the rotor 130 of the second embodiment, and is a sectional view taken along a line VIII-VIII in FIG. 7. FIG. 9 is a perspective view illustrating a part of the rotor 130 of the second embodiment, and is a sectional view taken along a line IX-IX in FIG. 7.

As illustrated in FIGS. 7 to 9, in a rotor body 132 of the rotor 130 of the second embodiment, a mold resin unit 112 includes the outside support 1, an inside support 102, a bridge unit 138, a disc 111, a plurality of coupling walls 101d, and a snap-fit unit 136. Unlike the rotor body 32 of the first embodiment, the rotor body 132 of the second embodiment does not include the cover member 35. In the second embodiment, the mold resin unit 112 corresponds to the support. As illustrated in FIG. 7, the inside support 102 includes a recess 102d recessed radially inward from the support face 2a. The recess 102d is open upward.

The bridge unit 138 extends in the radial direction to connect the outside support 1 and the inside support 102. For this reason, both the strength of the outside support 1 and the strength of the inside support 102 can be improved by the bridge unit 138. Consequently, the deformation of the outside support 1 and the inside support 102 supporting the permanent magnet 33 can be prevented, and a position shift of the permanent magnet 33 can be prevented.

In the second embodiment, the support is the mold resin unit 112 made of resin. For this reason, manufacturing cost of the support can be reduced. When the support is made of resin, the strength of the support tends to be lowered as compared with the case where the support is made of metal. For this reason, the effect that improves the strength is particularly useful when the support is the mold resin unit 112 made of resin as in the second embodiment.

For example, the bridge unit 138 has an elongated rod shape. The bridge unit 138 in the section orthogonal to the extending direction of the bridge unit 138 has a semicircular arc shape protruding upward. In the second embodiment, two bridge units 138 are provided for each pair of the outside support 1 and the inside support 102 disposed side by side in the radial direction. The two bridge units 138 are located on both sides in the circumferential direction of the permanent magnet 33 held by the pair of the outside support 1 and the inside support 102. Consequently, the strength of the outside support 1 and the inside support 102 supporting each permanent magnet 33 can further be improved. Thus, the permanent magnet 33 can more stably be held.

The bridge unit 138 extends radially outward from edges on both sides in the circumferential direction at the radial outer end of the upper face of the inside support 102, and is connected to the upper face of the second wall 1B in the upper face of the outside support 1. In the second embodiment, the two bridge units 138 provided in the pair of the outside support 1 and the inside support 102 extend in the radial direction parallel to the center line C of the permanent magnet 33 located between the two bridge units 138, and are parallel to each other.

As illustrated in FIG. 8, the bridge unit 138 is located above the outer core 34O. For this reason, the outer core 34O can be supported from above by the bridge unit 138. Consequently, the upward movement of the rotor core 34 with respect to the mold resin unit 112 can be prevented without providing a member such as the cover member 35 of the first embodiment. The bridge unit 138 is disposed in contact with the upper face of the outer core 34O. As illustrated in FIG. 7, the bridge unit 138 protrudes upward from the outside support 1 and the inside support 102.

For example, the case where the upper face of the bridge unit 138 is axially disposed at the same position as the upper faces of the outside support 1 and the inside support 102 in the case where the upper face of the outside support 1, the upper face of the inside support 102, and the upper face of the outer core 34O are located at the same position in the axial direction is considered. In this case, in order to dispose the bridge unit 138 on the upper side of the outer core 34O, it is necessary to notch the upper face of the outer core 34O toward the lower side to bury the bridge unit 138 in the notch. For this reason, a volume of the outer core 34O may be reduced, and the magnetic characteristic of the rotor 130 may be degraded. When the outer core 34O is formed by laminating electromagnetic steel sheets in the axial direction, it is necessary to change the shape of the electromagnetic steel sheet in the portion where the notch is provided, and man-hour for manufacturing the outer core 34O increases.

On the other hand, in the second embodiment, the bridge unit 138 protrudes upward from the outside support 1 and the inside support 102, so that the bridge unit 138 can be disposed on the upper side of the outer core 34O without downwardly notching the upper face of the outer core 34O. Consequently, the reduction of the volume of the outer core 34O can be prevented, and the decrease in magnetic characteristic of the rotor 130 can be prevented. The outer core 34O is formed by laminating the electromagnetic steel sheets having one type of shape, so that the increase in man-hour for manufacturing the outer core 34O can be prevented. As compared with the case where the outside support 1 and the inside support 102 are axially enlarged to align the axial position with the bridge unit 138, the axial dimensions of the outside support 1 and the inside support 102 can be reduced by protruding the bridge unit 138 from the outside support 1 and the inside support 102. Thus, the axial dimension of the mold resin unit 112 is easily kept small as a whole.

As illustrated in FIG. 8, in the second embodiment, the bridge units 138 are provided on the upper sides of both ends in the circumferential direction of the outer core 34O. For this reason, both the ends in the circumferential direction of the outer core 34O can be pressed from above by the bridge unit 138. Consequently, the upward movement of the rotor core 34 with respect to the mold resin unit 112 can further be prevented.

As illustrated in FIG. 9, the disc 111 supports the permanent magnet 33 on the lower side of the permanent magnet 33. For this reason, the outer core 34O can be supported while axially sandwiched between the disc 111 and the bridge unit 138. Consequently, the axial movement of the outer core 34O with respect to the mold resin unit 112 can further be prevented. The disc 111 connects the outside support 1 and the inside support 102. For this reason, the strength of the outside support 1 and the strength of the inside support 102 can further be improved. Consequently, the strength of the mold resin unit 112 can further be improved. In the second embodiment, a radially inner edge of the disc 111 is located on the radial inside of the inside support 102. The disc 111 supports the inner core 34I from the lower side.

As illustrated in FIG. 7, each of the plurality of coupling walls 101d connects the outside supports 1 adjacent to each other in the circumferential direction. Consequently, the strength of the outside support 1 adjacent to each other in the circumferential direction can further be improved. The coupling wall 101d protrudes upward from the disc 111. The coupling wall 101d is located on the radial outside of the outer core 34O. The coupling wall 101d supports the outer core 34O from the radial outside. The plurality of outside supports 1 and the plurality of coupling walls 101d constitute a cylindrical annular wall protruding upward from a radially outer circumferential edge of the disc 111. The annular wall surrounds the rotor core 34 on the radial outside of the rotor core 34. The annular wall surrounds the permanent magnet 33 on the radial outside of the permanent magnet 33.

As illustrated in FIG. 9, the snap-fit unit 136 extends upward from the lower face of the inner face of the recess 102d. The snap-fit unit 136 includes an extending unit 136a extending in the axial direction and a claw 136b protruding radially outward from the upper end of the extending unit 136a. The extending unit 136a extends upward from the lower face of the inner face of the recess 102d. The extending unit 136a has a plate shape in which a plate face faces the radial direction. The claw 136b is caught on the permanent magnet 33 from above. Consequently, the snap-fit unit 136 fixes the permanent magnet 33 to the mold resin unit 112 by snap-fitting. For this reason, the permanent magnet 33 can more stably be held by the mold resin unit 112. In fixing the permanent magnet 33, it is not necessary to use an adhesive or the like, and the permanent magnet 33 can easily be fixed to the mold resin unit 112. The permanent magnet 33 can be prevented from coming out upward without providing a member such as the cover member 35 of the first embodiment.

In the second embodiment, the claw 136b is caught in the upper face at the end on the radial inside of the permanent magnet 33. In the second embodiment, the claw 136b protrudes upward from the outside support 1 and the inside support 102.

For example, the case where the upper end of the claw 136b is axially disposed at the same position as the upper faces of the outside support 1 and the inside support 102 in the case where the upper face of the outside support 1, the upper face of the inside support 102, and the upper face of the permanent magnet 33 are located at the same position in the axial direction is considered. In this case, in order to catch the claw 136b on the permanent magnet 33 from the upper side, it is necessary to cut out the upper face of the permanent magnet 33 toward the lower side to catch the claw 136b in the notch. For this reason, there is a risk of decreasing the magnetic flux discharged from the permanent magnet 33.

On the other hand, in the second embodiment, the claw 136b protrudes upward from the outside support 1 and the inside support 102, so that the claw 136b can be caught on the permanent magnet 33 from above without downwardly notching the upper face of the permanent magnet 33. Consequently, the decrease in magnetic flux discharging from the permanent magnet 33 can be prevented.

In the second embodiment, the snap-fit unit 136 is provided in the inside support 102. For this reason, for example, as compared with the case where the snap-fit unit 136 is provided in the outside support 1, the permanent magnet 33 can more easily be disposed on the radial outside. Consequently, the outer core 34O can suitably be excited by the permanent magnet 33, and the motor torque can suitably be obtained.

For example, the snap-fit unit 136 applies elastic force to the permanent magnet 33 toward the radial outside. Consequently, the snap-fit unit 136 presses the permanent magnet 33 against the first wall 1A. Thus, the permanent magnet 33 can radially be sandwiched between the outside support 1 and the snap-fit unit 136 while contacting with the outside support 1 and the snap-fit unit 136. For this reason, the radial movement of the permanent magnet 33 can further be prevented.

The mold resin unit 112 includes a hole 111b axially penetrating the mold resin unit 112. In the second embodiment, the hole 111b is made in the disc 111. The hole 111b axially penetrates the disc 111. The hole 111b overlaps the claw 136b as viewed along the axial direction. The whole claw 136b overlaps the hole 111b as viewed along the axial direction. For this reason, when the mold resin unit 112 is resin-molded using two metal molds vertically divided, a portion of the metal mold used to make the claw 136b can easily be pulled up and down through the hole 111b. Thus, the snap-fit unit 136 can easily be molded.

Figure 10:
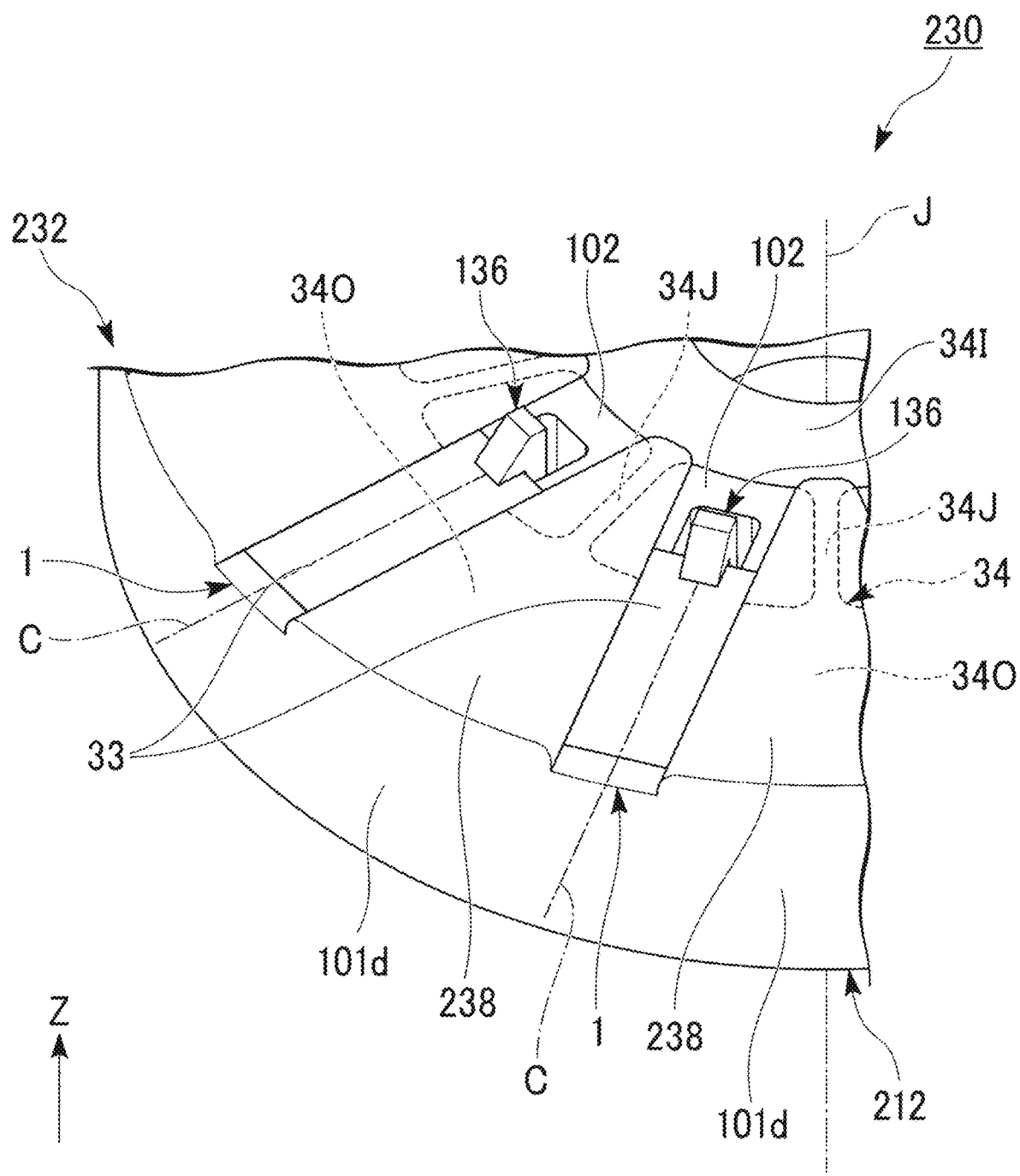
FIG. 10 is a perspective view illustrating a part of a rotor according to a third embodiment.

FIG. 10 is a perspective view illustrating a part of a rotor 230 according to a third embodiment. As illustrated in FIG. 10, in a rotor body 232 of the rotor 230 of the third embodiment, a bridge unit 238 of a mold resin unit 212 is different from the bridge unit 138 of the second embodiment in that the bridge unit 238 covers the whole upper face of the outer core 34O. For this reason, the outer core 34O can more firmly be pressed from the upper side by the bridge unit 238. Consequently, the upward movement of the rotor core 34 with respect to the mold resin unit 212 can further be prevented.

The bridge unit 238 extends from the upper face at the end on the radial inside of the inside support 102 to the upper face at the end on the radial outside of the outside support 1. The end on the radial outside of the bridge unit 238 is disposed across the upper sides of the pair of outside supports 1 adjacent to each other in the circumferential direction and the coupling wall 101*d* connecting the pair of outside supports 1. The end on the radial inside of the bridge unit 238 is disposed across the upper side of the pair of inside supports 102 adjacent to each other in the circumferential direction. As described above, in the bridge unit 238 of the third embodiment, the pair of outside supports 1 adjacent to each other in the circumferential direction and the inside supports 102 adjacent to each other in the circumferential direction are connected to each other, so that the strength of the outside support 1 and the strength of the inside support 102 can further be improved.

The dimension in the circumferential direction of the bridge unit 238 increases toward the radial outside. The edges on both sides in the circumferential direction of the bridge unit 238 are parallel to the center lines C of the permanent magnets 33 located on both sides in the circumferential direction of the bridge unit 238. The bridge unit 238 covers the whole upper face of the spoke 34J.

Although the preferred embodiments of the present disclosure are described above with reference to the accompanying drawings, the present disclosure is not limited to the embodiments. Various shapes, combinations, and the like of the constituent members in the above embodiments are only by way of example, and various modifications can be made based on design requirements and the like without departing from the scope of the present disclosure.

For example, in the above embodiment, the first wall 1A and the second wall 1B are provided in the square, substantially U-shape including the opening on the radial inside. Alternatively, for example, the first wall 1A may extend along the outer circumference and be connected to the outermost circumferential faces of the core pieces 34N, 34S adjacent to each other in the circumferential direction. The first wall 1A is connected to the outermost circumferential faces of the core pieces 34N, 34S adjacent to each other in the circumferential direction, thereby increasing the strength against a load applied in the radial direction. The increase in strength of the first wall 1A with respect to the load applied in the radial direction can further prevent the permanent magnets 33A, 33B from scattering radially outward due to the centrifugal force associated with the rotation of the rotor 30.

Figure 11:
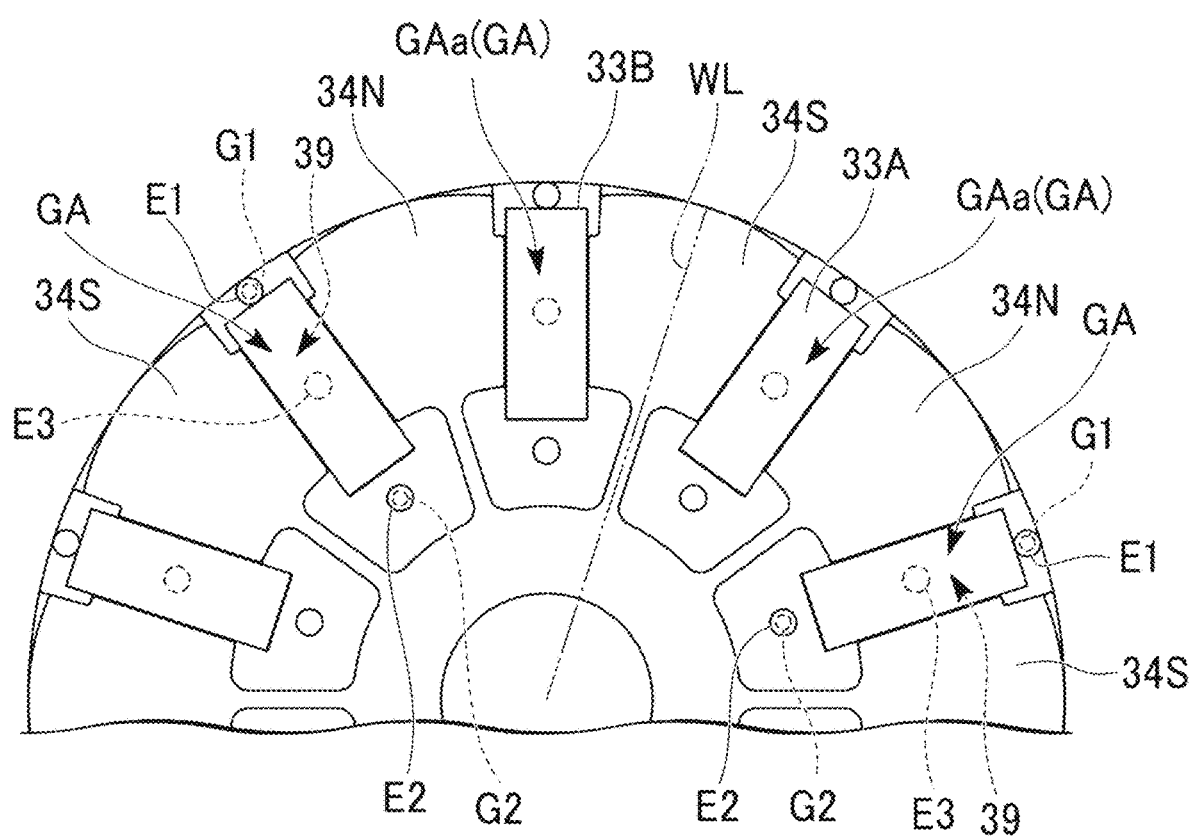
FIG. 11 is a view illustrating a rotor according to a modification.

In the first embodiment, by way of example, the gate marks are provided in all the regions GA. However, but the present disclosure is not limited to this configuration. The gate mark may be provided in the region GA adjacent to even-numbered regions GA where the gate mark is not disposed in all the regions GA. FIG. 11 illustrates a configuration in which the gate marks G1, G2 are provided in the region GA adjacent to two regions GAa where the gate mark is not disposed. As illustrated in FIG. 11, when the gate marks G1, G2 are disposed in the area GA adjacent to the even-numbered regions GAa where the gate mark is not disposed, the weld line WL is molded away from the region GAa where the gate mark is not disposed. Thus, the weld line WL is not molded in the outside support 1 and the inside support 2, so that the damage to the outside support 1 and the inside support 2 and the degradation of the cogging torque can be prevented.

In the first embodiment, by way of example, the configuration in which the through-hole 11*a* having the radius as the distance from the center axis J to the radially inside face of the inside support 2 is made in the disc 11 of the mold resin unit 12. However, the present disclosure is not limited to this configuration. As in the second embodiment, the disc 11 may protrude from the radially inside face of the inside support 2 toward the side of the center axis J, and axially overlap the inner core 34I. When the disc 11 axially overlaps the inner core 34I, a gate trace may be provided at a position where the disc 11 axially overlaps the inner core 34I instead of the gate mark G2. The position at which the disc 11 axially overlaps the inner core 34I is close to the inside support 2, so that the inside support 2 can be molded without generating the weld line WL before joining the molten resin material from another gate in the molded body forming process.

When the disc 11 axially overlaps the inner core 34I, preferably the gate marks are disposed on both the position overlapping the inside support 2 as viewed in the axial direction and the position overlapping the outside support 1, or disposed on both the position overlapping the outside support 1 as viewed in the axial direction and the position overlapping the inner core 34I. When gate marks are disposed at both the position overlapping the inside support 2 and the position overlapping the outside support 1, or disposed at both the position overlapping the outside support 1 and the position overlapping the inner core 34I, both the outside support 1 and the inside support 2 can be molded without generating the weld line WL.

In the second and third embodiments, the bridge unit is not particularly limited as long as the outside support 1 and the inside support 102 are connected to each other. For example, in the second embodiment, only one bridge unit 138 may be provided for each pair of the outside support 1 and the inside support 102. Further, a bridge unit located below the outer core 34O may be provided instead of the disc. In this case, the outer core 34O is supported while axially sandwiched between the bridge units located on both sides in the axial direction. The snap-fit unit may not be provided.

Applications of the motors of the above embodiments in the present disclosure are not particularly limited. For example, the motors can be used for a gear selection of a transmission such as a dual clutch transmission (DCT) mounted on a vehicle, and drive of a clutch. The vibration of the vehicle motor can be reduced using the motor of each embodiment of the present disclosure.

For example, the motor of each embodiment of the present disclosure is used for a robot. The motor of each embodiment can be used to drive a hand, an arm, and the like in the robot. A low-vibration robot can be obtained using the motor of each embodiment.

Figure 12:
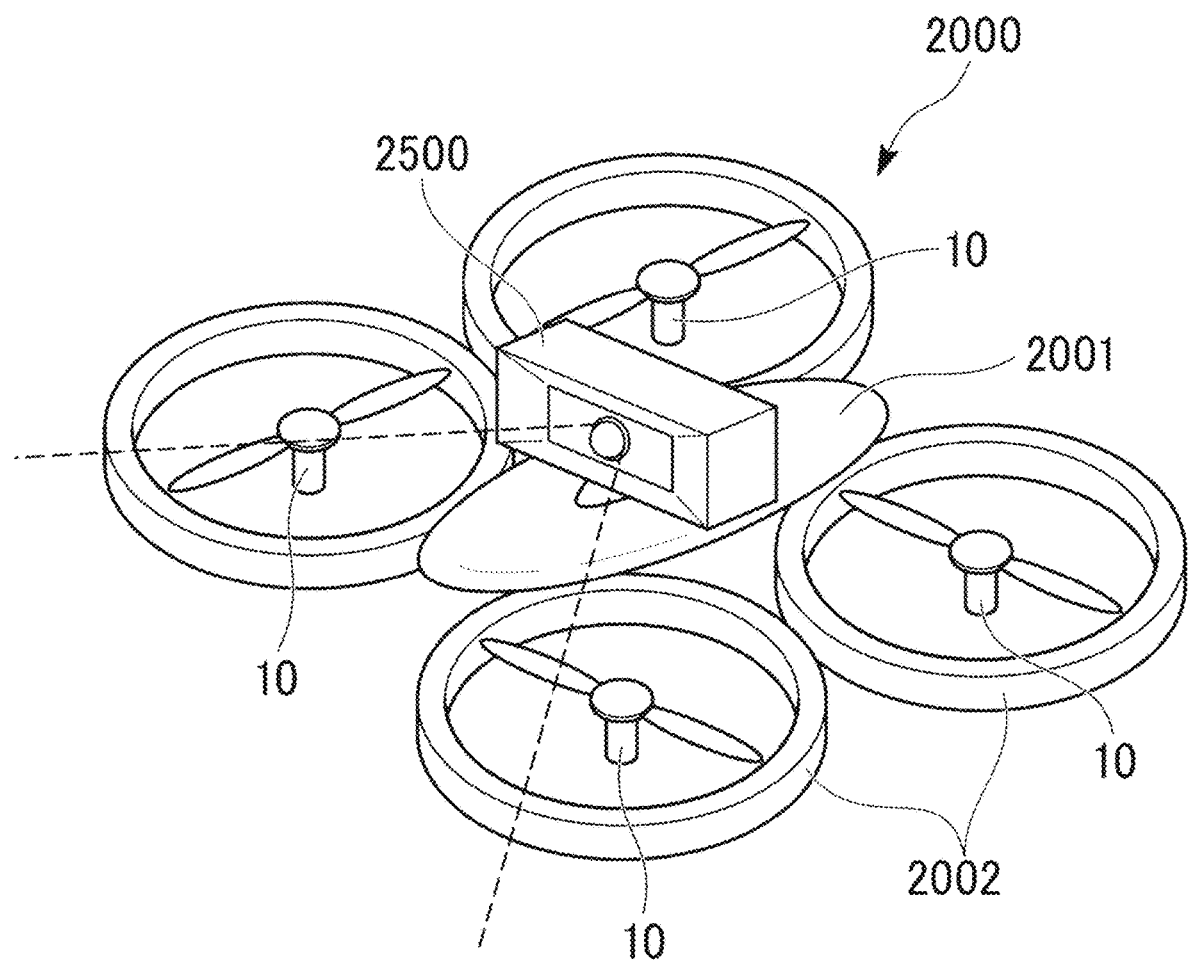
FIG. 12 is a perspective view illustrating an unmanned flying body according to an embodiment.

For example, the motor of each embodiment of the present disclosure is used for an unmanned flying body. FIG. 12 is a perspective view illustrating an unmanned flying body 2000 that is an example of the unmanned flying body. The unmanned flying body 2000 includes a main body 2001, a rotary blade 2002, an imaging device 2500, and the motor 10 of the first embodiment. The motor 10 rotates the rotary blade 2002. Because the unmanned flying body 2000 includes the motor 10, the unmanned flying body 2000 can fly with low vibration. The unmanned flying body 2000 can capture an image with high accuracy while flying with low vibration. A motor including the rotor 130 of the second embodiment may be mounted on the unmanned flying body 2000 instead of the motor 10, or a motor including the rotor 230 of the third embodiment may be mounted on the unmanned flying body 2000 instead of the motor 10.

Figure 13:
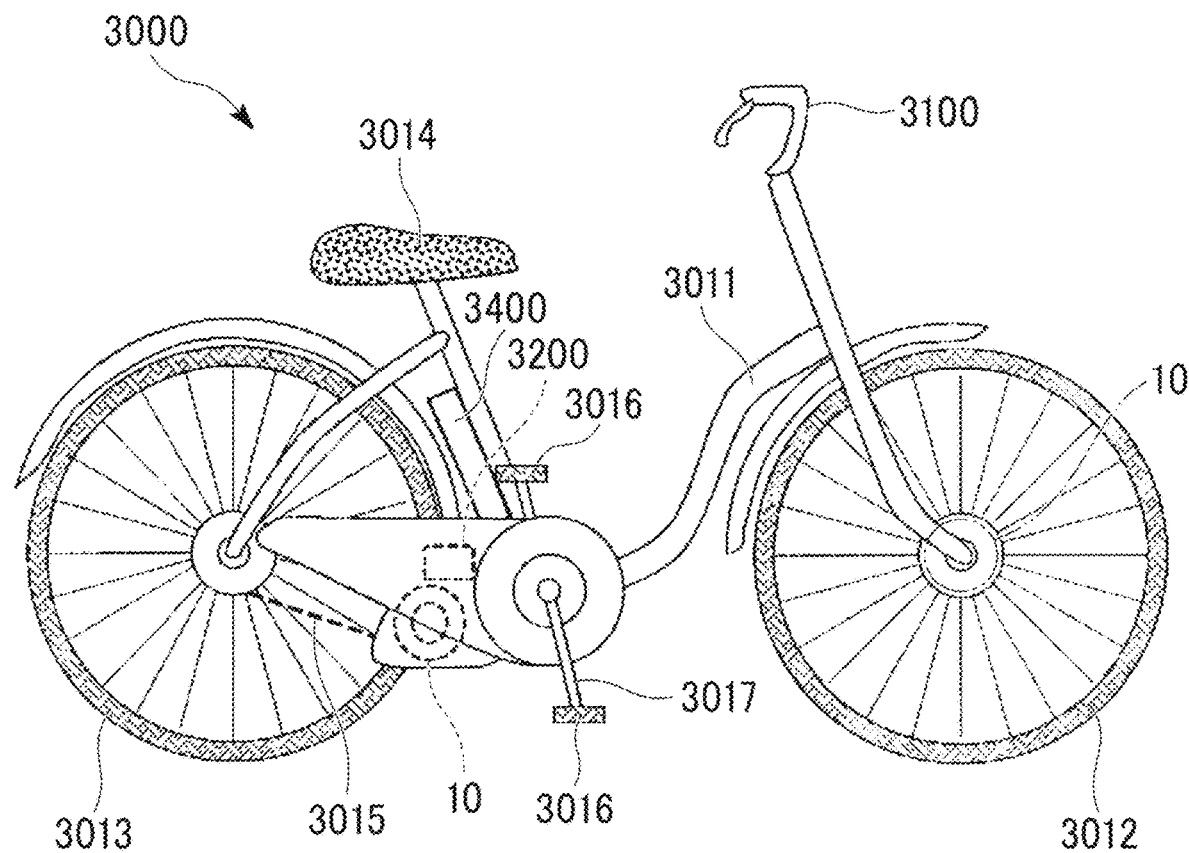
FIG. 13 is a side view illustrating an electric assist bicycle according to an embodiment.

For example, the motor of each embodiment of the present disclosure is used for an electric assist device. FIG. 13 is a side view illustrating an electric assist bicycle 3000 that is an example of the electric assist device. The electric assist bicycle 3000 is a bicycle that assists a person using a motor.

The electric assist bicycle 3000 includes a microprocessor 3200 that is a signal processing device, the motor 10 of the first embodiment, and a battery 3400 in addition to components included in a typical bicycle. Examples of components included in the typical bicycle include a handle 3100, a frame 3011, a front wheel 3012, a rear wheel 3013, a saddle 3014, a chain 3015, a pedal 3016, and a crank 3017. The rear wheel 3013 is mechanically connected to the motor 10 through the chain 3015. The rear wheel 3013 is rotated by manpower torque applied by the pedal 3016 and motor torque applied by the motor 10. Consequently, the electric assist bicycle 3000 is driven.

Because the electric assist bicycle 3000 includes the motor 10, the electric assist bicycle 3000 is driven with low vibration to improve ride quality. In the electric assist bicycle 3000, the front wheel 3012 may mechanically be connected to the motor 10 through a chain (not illustrated), and rotate using the motor torque applied by the motor 10. For example, the motor 10 may be disposed in a central portion of the front wheel 3012 as indicated by a two-dot chain line in FIG. 13. In this case, the front wheel 3012 is mechanically connected to the motor 10 with no use of the chain 3015. In this case, the shaft 31 of the motor 10 may be fixed to the frame 3011 of the electric assist bicycle 3000, and a hub portion connected to the radial spokes of the front wheel 3012 may rotate using the motor torque. Although not illustrated, the motor 10 may be disposed in the central portion of the rear wheel 3013 similarly to the case where the motor 10 is disposed in the central portion of the front wheel 3012. The motor including the rotor 130 of the second embodiment may be mounted on the electric assist bicycle 3000 instead of the motor 10, or the motor including the rotor 230 of the third embodiment may be mounted on the electric assist bicycle 3000 instead of the motor 10.

The above configurations described in the description can appropriately be combined within a range where the configurations are not contradictory to each other.

The invention claimed is:

1. A rotor comprising:
   a shaft disposed along a center axis extending in a vertical direction;
   a rotor core including an inner core disposed along a circumferential direction on a radial outside of the shaft and a plurality of outer cores disposed away from each other along the circumferential direction on the radial outside of the inner core;
   a plurality of permanent magnets disposed alternately with the outer cores in the circumferential direction on the radial outside of the shaft, the permanent magnets exciting the outer cores; and
   a support supporting the permanent magnets,
   wherein the support includes
      an outside support fixed to a radial outside of the outer cores to circumferentially support an end face of each of the permanent magnets from both sides,
      an inside support fixed to a radial inside of the outer cores to circumferentially support the end face of each of the permanent magnets from both sides, and
      a bridge unit extending radially to connect the outside support and the inside support, wherein the bridge unit is located on one side in a central axis direction of each of the outer cores, and
   each outer core among the outer cores includes an opposite face opposed parallel to the end face of an adjacent permanent magnet among the permanent magnets in the circumferential direction, wherein
      each of the outside support and the inside support includes a support face circumferentially supporting the end face of the adjacent permanent magnet, and
      the support face is disposed on a side closer to a center line of the adjacent permanent magnet than the opposite face of said each outer core in the circumferential direction.

2. The rotor according to claim 1, wherein the support includes a disc and at least one of the outside support or the inside support protruding from the disc toward the one side in the center axis direction.

3. The rotor according to claim 2, further comprising a cover member covering at least a part of the support on the one side in the center axis direction,
   wherein the cover member is fixed to the outside support by snap-fitting.

4. The rotor according to claim 1, wherein the bridge unit protrudes toward the one side in the center axis direction from the outside support and the inside support.

5. The rotor according to claim 1, wherein the bridge unit is provided on the one side in the center axis direction of each of both circumferential ends of each of the outer cores.

6. The rotor according to claim 1, wherein the bridge unit covers a whole face on the one side in the center axis direction of each of the outer cores.

7. The rotor according to claim 1, wherein the support includes a disc supporting each of the permanent magnets on another side in the center axis direction of each of the permanent magnets, the another side being opposite to the one side in the center axis direction, and
   the disc connects the outside support and the inside support.

8. The rotor according to claim 1, the inside support is disposed on a radial inside of each of the permanent magnets in the rotor core.

9. The rotor according to claim 1, wherein an outer end in the radial direction of the adjacent permanent magnet protrudes radially outward from the opposite face of said each outer core, and
   the outside support is disposed radially outward of the opposite face of said each outer core.

10. The rotor according to claim 1, wherein the outside support covers a radially outside face of each of the permanent magnets.

11. The rotor according to claim 10, wherein a portion covering the radially outside face of each of the permanent magnets in the outside support is connected to an outermost circumferential face of each of the outer cores adjacent in the circumferential direction.

12. The rotor according to claim 1, wherein each of the permanent magnets is press-fitted in the support face of the outside support and the support face of the inside support.

13. The rotor according to claim 1, wherein the support includes a snap-fit unit fixing each permanent magnet among the permanent magnets to the support by snap-fitting, and
   the snap-fit unit includes a claw that is caught on said each permanent magnet from the one side in the center axis direction.

14. The rotor according to claim 13, wherein
the claw protrudes onto the one side in the center axis direction beyond a height of the outside support and a height of the inside support.

15. The rotor according to claim 1, wherein
the support is a mold resin unit made of resin.

16. A spoke type motor comprising:
a stator; and
the rotor according to claim 1, which is rotatable about the center axis relative to the stator.

17. A vehicle motor comprising the spoke type motor according to claim 16 as a motor configured to drive a dual clutch transmission.

18. A robot device comprising the spoke type motor according to claim 16.

19. A rotor, comprising:
a shaft disposed along a center axis extending in a vertical direction;
a rotor core including an inner core disposed along a circumferential direction on a radial outside of the shaft and a plurality of outer cores disposed away from each other along the circumferential direction on the radial outside of the inner core;
a plurality of permanent magnets disposed alternately with the outer cores in the circumferential direction on the radial outside of the shaft, the permanent magnets exciting the outer cores; and
a support supporting the permanent magnets,
wherein
the support includes at least one of an outside support fixed to a radial outside of the outer cores to circumferentially support an end face of each of the permanent magnets from both sides, and an inside support fixed to a radial inside of the outer cores to circumferentially support the end face of each of the permanent magnets from both sides,
each outer core among the outer cores includes an opposite face opposed parallel to the end face of an adjacent permanent magnet among the permanent magnets in the circumferential direction, wherein
each of the outside support and the inside support includes a support face circumferentially supporting the end face of the adjacent permanent magnet, and
the support face is disposed on a side closer to a center line of the adjacent permanent magnet than the opposite face of said each outer core in the circumferential direction, and
the support includes a snap-fit unit fixing each permanent magnet among the permanent magnets to the support by snap-fitting, and the snap-fit unit includes a claw that is caught on said each permanent magnet from one side in a center axis direction.

* * * * *